United States Patent [19]

Hersom et al.

[11] Patent Number: 5,721,431
[45] Date of Patent: Feb. 24, 1998

[54] SATELLITE ATTITUDE SENSOR USING THERMAL IMAGING

[75] Inventors: Charles Hersom, Toronto; Zvika Afik, Saint-Laurent; Allan Hollinger, North York; Paul J. Thomas, East York, all of Canada

[73] Assignee: Institute for Space and Terrestrial Science, North York, Canada

[21] Appl. No.: 710,308

[22] Filed: Sep. 17, 1996

[51] Int. Cl.$^6$ ............................................... G01J 1/42
[52] U.S. Cl. .......................... 250/342; 250/340; 250/353
[58] Field of Search ................................. 250/340, 342, 250/349, 353

[56] References Cited

U.S. PATENT DOCUMENTS

| | | | |
|---|---|---|---|
| 3,551,681 | 12/1970 | Atheimer | 250/349 |
| 4,257,106 | 3/1981 | Auer | 250/338.1 |
| 5,160,842 | 11/1992 | Johnson | 250/342 |
| 5,585,633 | 12/1996 | Tulet | 250/349 |

*Primary Examiner*—Don Wong
*Attorney, Agent, or Firm*—Lynn C. Schumacher; Dowell & Dowell

[57] ABSTRACT

The present invention provides a method for distinguishing a boundary of an object, and the object itself, from its background. In the method electromagnetic radiation is detected from at least two fields of view substantially spanning the boundary of the object and background adjacent to the boundary and superimposed or overlaid as images onto a detector. The method includes correlating spatial transitions in intensity of the overlaid images on the detector with a boundary of the object. When used for determining the attitude of a satellite with respect to the earth, the detector is a thermal infrared detector thereby providing a sharp contrast between the thermal emission of the earth and cold space. The invention provides a simple, effective method and device for determining satellite orientation and/or attitude with respect to a thermal infrared-emitting target body. The sensor includes a segmented limb-looking mirror to provide multiple fields-of-view within the field-of-regard and superimposing these fields-of-view as images onto a common detector. The required resolution can be obtained while providing a wide range of operational orbital altitudes. Multiple channels in a modular form provide redundancy, improved accuracy, and the opportunity of providing more diverse configurations. The utilization of uncooled microbolometer arrays as imaging detectors removes the requirement for additional cooling equipment thereby providing a low cost, small size and low mass sensor with configurational flexibility.

33 Claims, 11 Drawing Sheets

SATELLITE ATTITUDE SENSOR USING THERMAL IMAGING

FIELD OF THE INVENTION

The present invention relates to a method and apparatus for orientation and attitude control of satellites using the overlay or superposition of images.

BACKGROUND OF THE INVENTION

Satellite attitude control is traditionally achieved using sensors and actuators to detect orientation errors and provide the necessary control torques to correct the errors. Earth sensors are used to determine the satellite orientation with respect to the earth. Infrared detectors are commonly used to determine the location of the earth's horizon against the cold background of space. Generally, individual photodiodes am employed as the detector(s) along with rotating or scanning mechanisms to allow a periodic sweep of the detector across the space/earth and earth/space boundaries. The centre of the earth is determined as the midpoint between the two horizon transitions.

Satellites are typically stabilized so that their axes have a known relationship with earth to facilitate such activities as earth observation and communication with ground terminals. Certain types of satellites are stabilized by spinning about one of their axes while other types are three-axis controlled so that the orientation of the satellite is maintained as required. Earth sensors are used for both applications and most geosynchronous satellites use spin stabilization at least during the transfer orbit phase prior to deployment on station. In order to satisfy both stabilization scenarios, these satellites usually carry two completely different sets of equipment including both earth and sun sensors. The need for two completely different types of equipment is a major drawback in satellite design because of the added mass. Therefore, it would be very advantageous to provide a satellite attitude sensor system which can function in both spinning and non-spinning modes.

Another major drawback of present earth horizon sensors is that they are usually designed to operate at a specific orbital altitude and therefore the optics are optimized accordingly. It would be very advantageous to provide a satellite attitude sensor which can operate over a wide range of altitudes while still maintaining the required resolution.

SUMMARY OF THE INVENTION

An object of the present invention is to provide an apparatus and method for satellite orientation and attitude control using an optical overlay of thermal images to achieve high resolution while maintaining a wide field-of-regard and thus permitting operation over a wide range of altitude.

Another object of the present invention is to provide a method and apparatus for sensing wildfires on earth from satellites.

Still another object of the present invention is to provide a satellite attitude sensor which can operate as both an earth and sun sensor in a spinning environment and also as the earth sensor in the non-spinning case thereby providing considerable savings in launch mass and overall cost.

In one aspect of the invention there is provided a method for distinguishing a boundary of an object or the object itself from its background. The method comprises detecting electromagnetic radiation from at least two fields of view substantially spanning at least a portion of the boundary of the object and background adjacent to the at least a portion of the boundary and superimposing the detected radiation from the at least two fields of view as images onto a detector means. The method includes correlating transitions in intensity of the superimposed images on the detector means with the boundary of the object.

In another aspect there is provided a device for distinguishing a boundary of an object or the object itself from its background. The device comprises a housing, detection means mounted in the housing for detecting electromagnetic radiation, an optical module mounted in the housing for superimposing electromagnetic radiation from at least two fields of view substantially spanning at least a portion of the boundary of the object and background adjacent to the at least a portion of the boundary as overlaid images onto the detection means. The device includes means for correlating a spatial transition in intensity of the overlaid images on the detection means with a boundary of the object.

The present invention also provides a satellite sensor device for detecting fires on the earth. The device comprises a sensor housing, an infrared detector mounted in the housing for detecting infrared electromagnetic radiation characteristic of fires. The device includes optical focusing means mounted in the sensor housing for superimposing images from at least two adjacent fields of view of the earth's surface as overlaid images onto the infrared detector. Included is processing means for correlating a spatial transition in intensity of the overlaid images on the infrared detector with a boundary of a region emitting infrared radiation characteristic of fires.

More specifically, the present invention advantageously provides a simple, effective method of, and sensor for, determining satellite orientation and/or attitude with respect to a thermal infrared-emitting target body. The sensor includes a segmented limb-looking mirror to provide multiple fields-of-view within the field-of-regard and superimposing the images from these fields-of-view onto a common detector. The required resolution can be obtained while providing a wide range of operational orbital altitudes. Multiple channels in a modular form provide redundancy, improved accuracy, and the opportunity of providing more diverse configurations. The utilization of uncooled microbolometer arrays as imaging detectors removes the requirement for additional cooling equipment. These features provide for a low cost, small size, low mass sensor with configurational flexibility to meet typical attitude requirements.

The use of uncooled microbolometer arrays as imaging detectors advantageously permits replacement of individual photodiodes by one- or two-dimensional matrices of detector pixels. These can be used to determine the horizon transition location when the earth/space transition area is imaged onto the detector array.

The satellite attitude sensor of the present invention can perform as both the earth and sun sensor in a spinning environment and also as the earth sensor in the non-spinning case. Thus a single sensor can replace dual detector systems typically present in geosynchronous satellites thereby saving launch mass and overall cost.

BRIEF DESCRIPTION OF THE DRAWINGS

The method and apparatus forming the present invention, will now be described, by way of example only, reference being had to the accompanying drawings, in which.

DETAILED DESCRIPTION OF THE INVENTION

Figure 1:
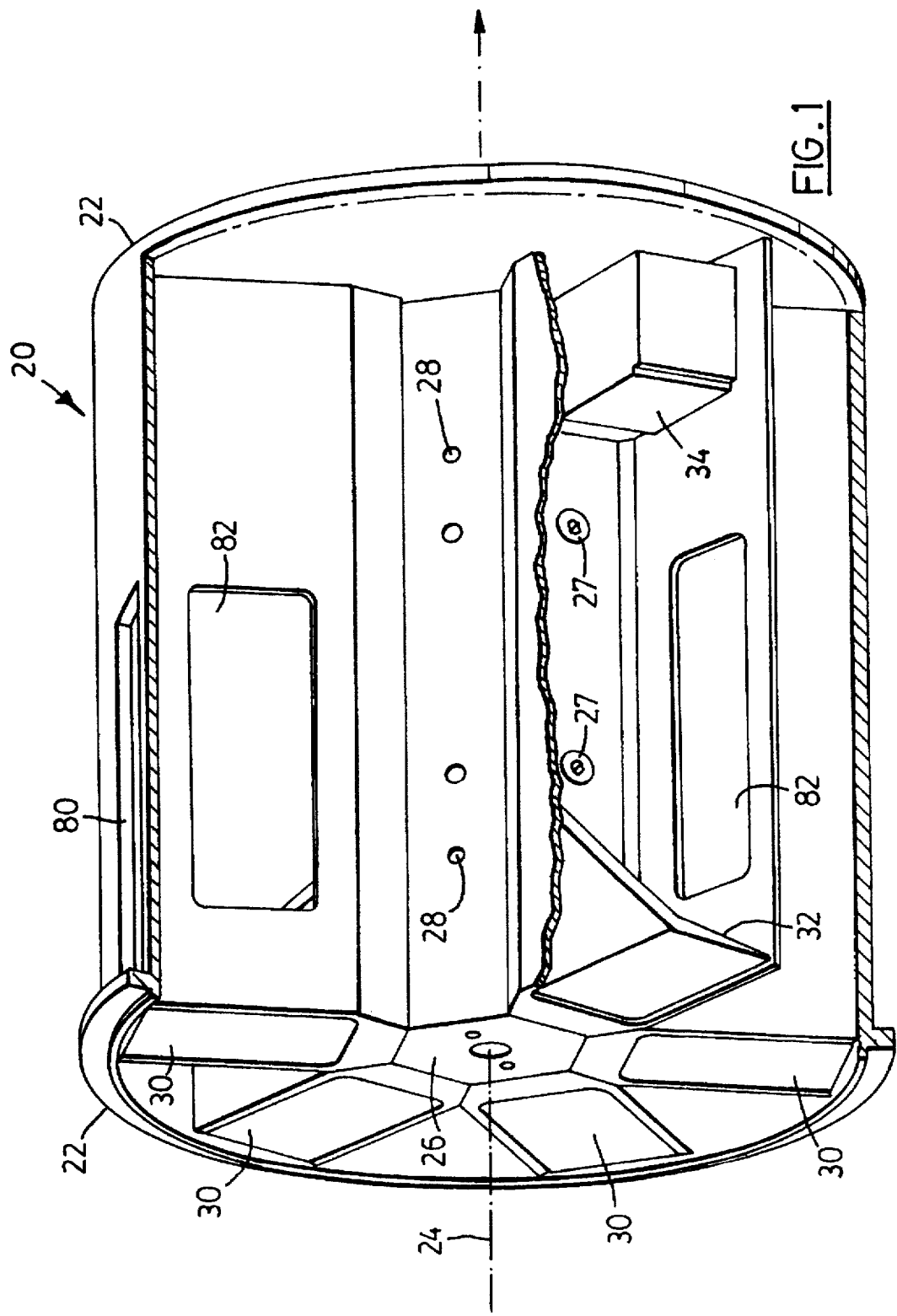
FIG. 1 illustrates a satellite attitude sensor (SAS) constructed in accordance with the present invention provided with multiple optical channels.

Referring first to FIG. 1, a satellite attitude sensor constructed in accordance with the present invention is shown generally at 20. Sensor 20 is provided with a housing 22 fabricated of a strong, light weight material such as aluminum. Titanium, although more expensive than aluminum, may also be used to construct housing 22. Housing 22 defines an axis 24 and includes a mounting pylon 26 with locating pins 28. Sensor 20 is provided with several optical modules 30 disposed about axis 24 and rigidly attached to mounting pylon 26 by bolts 27 with the aid of locating pins 28. Those skilled in the art will appreciate that other types of precision locating and fastening devices may be used in place of pins 28 and bolts 27.

Figure 2:
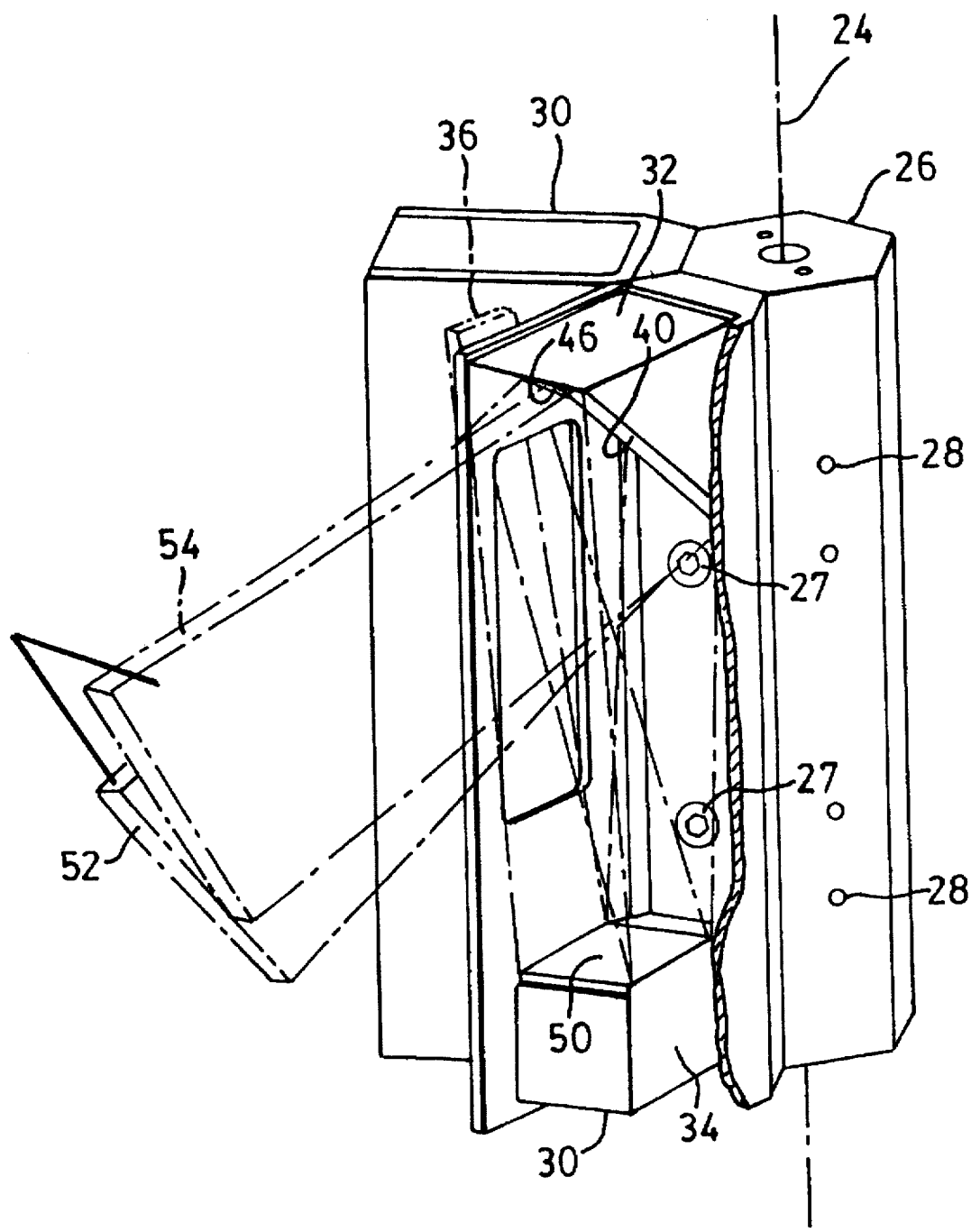
FIG. 2 illustrates the configuration of an optical module of the satellite attitude sensor using reflective optics and a detector.
Figure 3A:
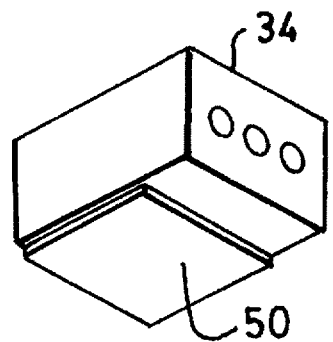
FIG. 3a is an isometric view of a focussing mirror used in the optical module of FIG. 2.
Figure 3B:
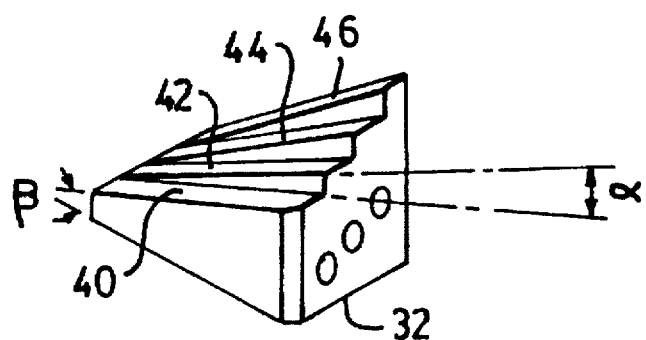
FIG. 3b is an isometric view of a segmented limb-looking mirror used in the optical module of FIG. 2.
Figure 3C:
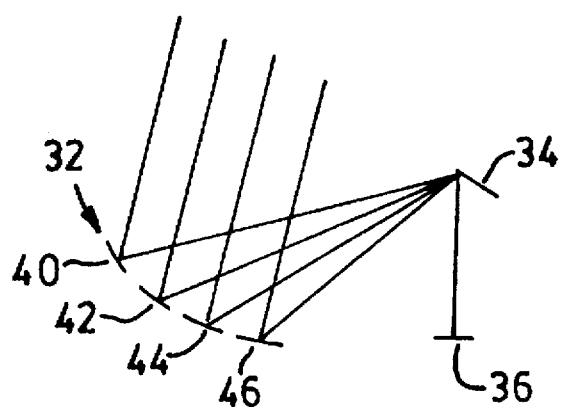
FIG. 3c is a diagrammatic representation of one optical channel which provides four fields-of-view.

Details of the opto-mechanical design of the focusing array are illustrated in FIG. 2 in which two optical modules 30 are shown. Module 30 comprises a limb-looking entrance mirror 32 for receiving images from the celestial body and background region which the satellite is tracking, a focusing mirror 34 onto which the images are reflected from mirror 32, and a detector 36 located at the final image position which receives the input images from mirror 34 in an overlay arrangement. With reference to FIG. 3b segmented limb-looking mirror 32 is provided with four planar reflective mirror segments 40, 42, 44 and 46 in a segmented configuration with a preselected angle α between the reflective plane of each segment. Focusing mirror 34 is provided with a single curved (concave) reflective surface 50 which focuses the four images provided by limb-looking mirror 32 at the final image position on detector 36 (FIG. 2). FIG. 3c shows a diagrammatic representation of one of the optical channels to give four overlaid images.

The optics/detectors are modularized so that each individual module contains its own optics and a detector 36. Detectors 36 are mounted onto a printed circuit board (not shown) at the bottom of each module. Each detector 36 is interfaced with the central processing electronics (not shown) located below the modules in the base of the sensor unit.

The satellite attitude sensor as illustrated in FIG. 1 employs a thermal infrared sensor 36 which detects the earth horizon against the cold background of space. The limb-looking mirror 32 of each optical channel (or module) comprises four flat segments, each segment being rotated with respect to the next segment by a preselected amount in order to direct an adjacent angular region approximately perpendicular to the earth horizon onto the focusing mirror 34. The input radiation to all the mirror segments is focused onto the quasi-linear detector array. Thus each array may have a number of earth overlays. At least one of these overlays will contain the earth-space transition so that a readout of the detector will locate this transition. The amount of earth radiation will readily indicate in which segment the transition occurs. However, with appropriate initialization and an approximate knowledge of the orbital altitude, the location of the transition amongst the multiple fields-of-view in each detector is determinable by the recent history since the transition is expected to shift much more slowly than the sampling rate of the detectors.

Since the sensor 20 uses at least three channels when used for satellite attitude sensing, the processor controlling the sensor can determine the solution to the three-unknown problem and provide satellite orientation in the pitch and roll axes and also altitude. The six channel sensor 20 of FIG. 1 is preferable to provide more data for redundancy, error reduction and further extension of the field of coverage.

Figure 4:
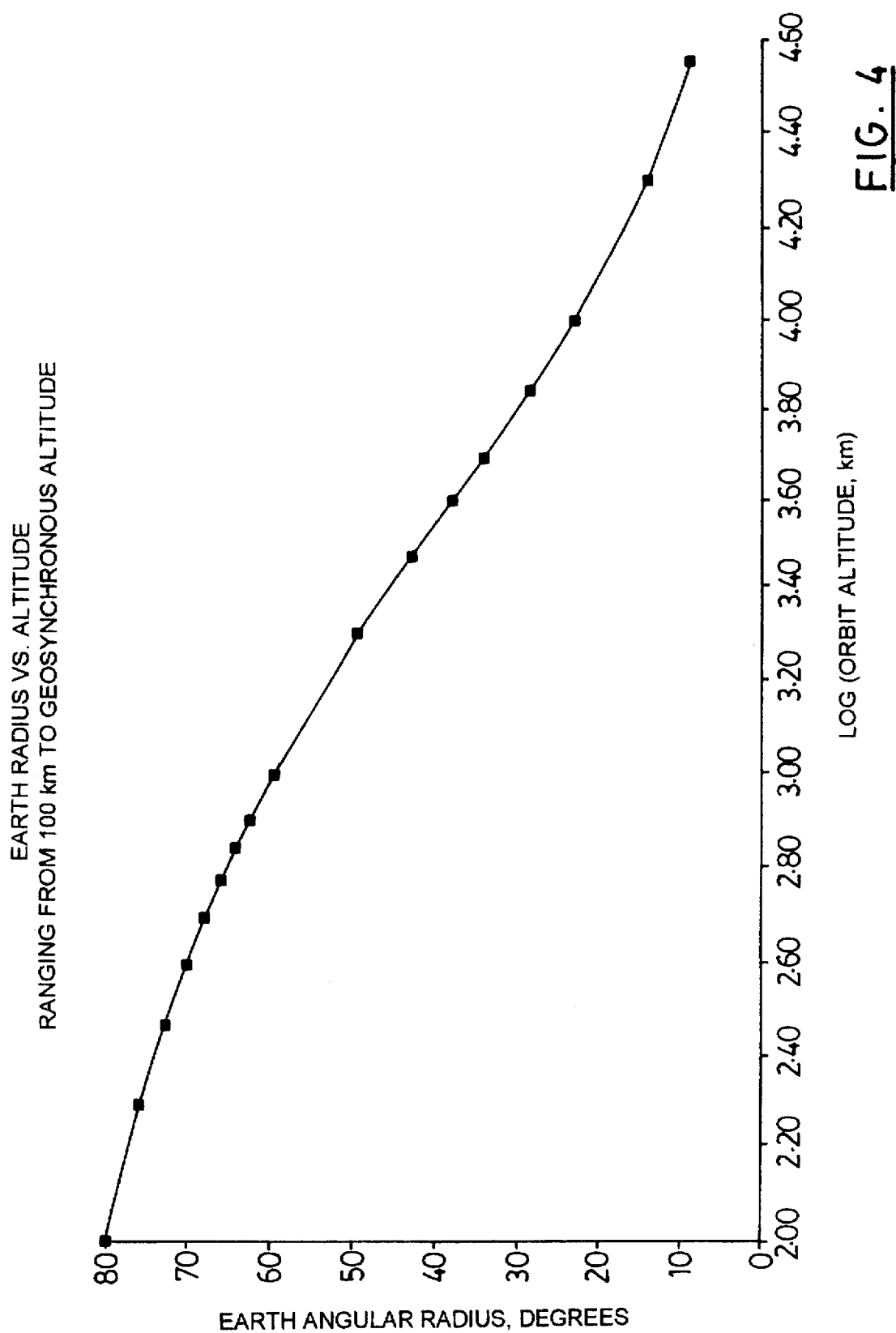
FIG. 4 is a graph of the Earth's angular radius as observed from altitudes from 100 to 40,000 km above the earth which provides the range of orbital altitudes available for a specific field-of-regard of the sensor.

More specifically, sensor 20 comprises six channels (each channel associated with an optical module 30) with a common field-of-regard for all channels and views four fields of view (see FIG. 2) because limb-looking mirror 32 comprises four segments 40 to 46. With axis 24 of the housing pointing toward earth the field-of-regard is about 40 degrees with 4 adjacent fields-of-view of about 10 degrees each. Two fields of view 52 and 54 are shown in FIG. 2 for purposes of illustration. The earth appears from orbit to be a warm body against the cold background of space. Dependent on the orbit altitude, the earth subtends a wide range of angular radii. At low earth orbit (LEO), the earth image appears to be about 160 degrees wide, while in geostationary earth orbit (GEO) the earth is about 17 degrees in diameter. FIG. 4 illustrates the relationship between orbit altitude and the apparent earth angular radius. As depicted in FIG. 4, the field-of-regard may be selected to cover any orbital altitude range within the 40 degrees. For example, for the LEO case, the field-of-regard can be chosen to accommodate the orbital altitude range from 200 to 4000 km by selecting a field of regard which encompasses the angular radius of the earth between 76 and 36 degrees as measured from nadir as seen from the orbiting satellite.

Figure 5:
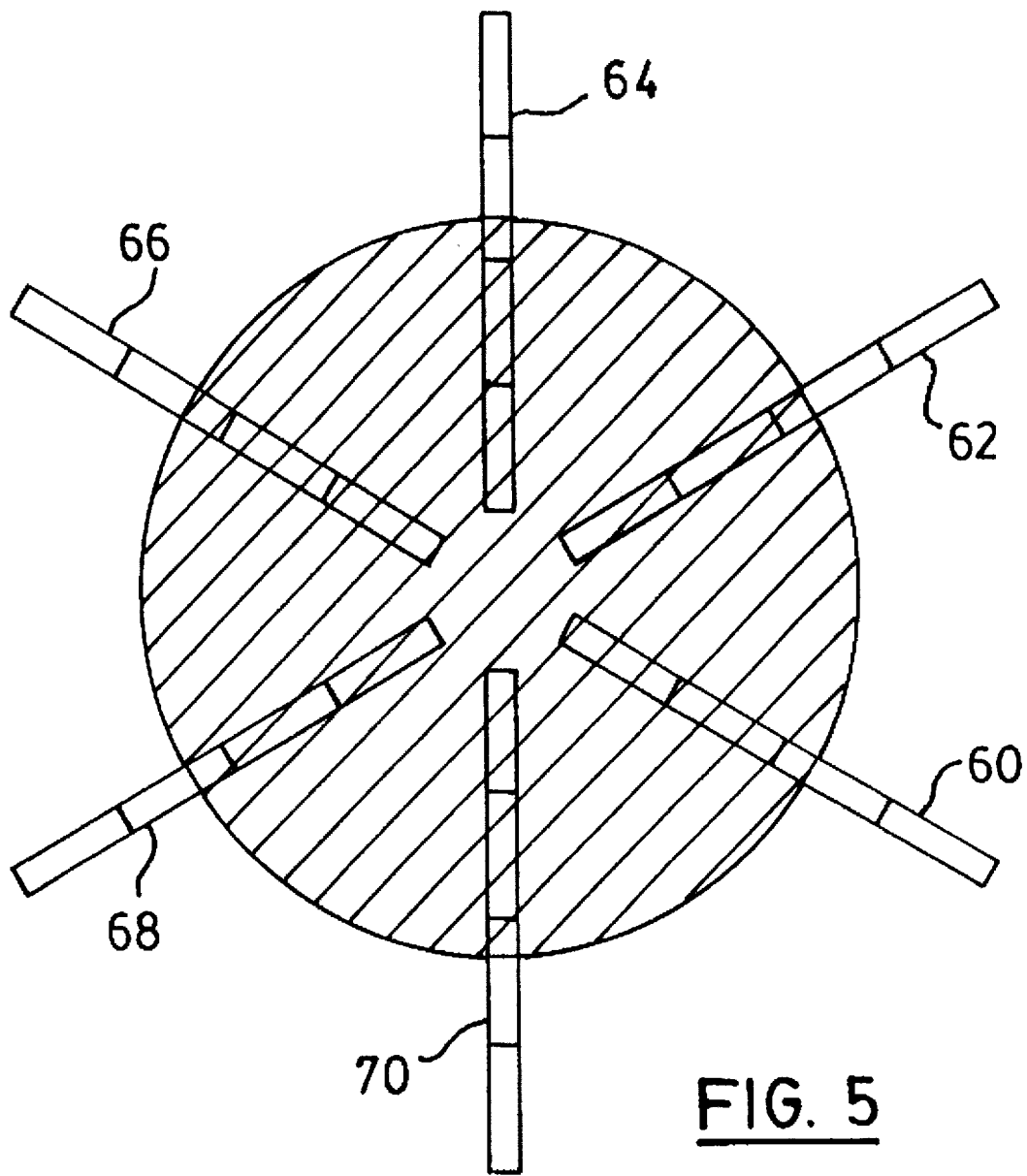
FIG. 5 is an illustration of the field-of-regard and the four fields-of-view with respect to the Earth horizon disk as viewed with the six channel sensor of FIG. 1.

The six channels of sensor 20 are identical in configuration but view six separate radial strips 60, 62, 64, 68, 68 and 70 around the Earth's horizon periphery as illustrated in FIG. 5. Each strip is comprised of four sections representing the individual fields-of-view provided by the four mirror segments 40, 42, 44 and 46 of mirror 32 as shown in FIG. 3b.

The cut-away drawing of the six channel sensor 20 in FIG. 1 shows the relative positioning of the different mirrors 32 and 34. Each optical module 30 is provided with an aperture 80 in the outer wall of housing 22 to allow viewing of the Earth and an aperture 82 in one wall of each channel allows the focused images reflected from mirror 34 to reach detector 36 which is located in the area between each optics module, best seen in FIG. 2.

The angle of the overall limb-looking mirror 32 may be readily changed to accommodate other altitude ranges. Referring to FIG. 3b, only the segmented mirror 32 needs to be modified and this can be achieved by changing the angle β between reflective surface 40 and the base of the mirror which controls the location of the field-of-regard. The individual mirror segments of mirror 32 do not change with respect to each other as they provide the sequential set of fields-of-view for any setting of the field-of-regard location.

Figure 6:
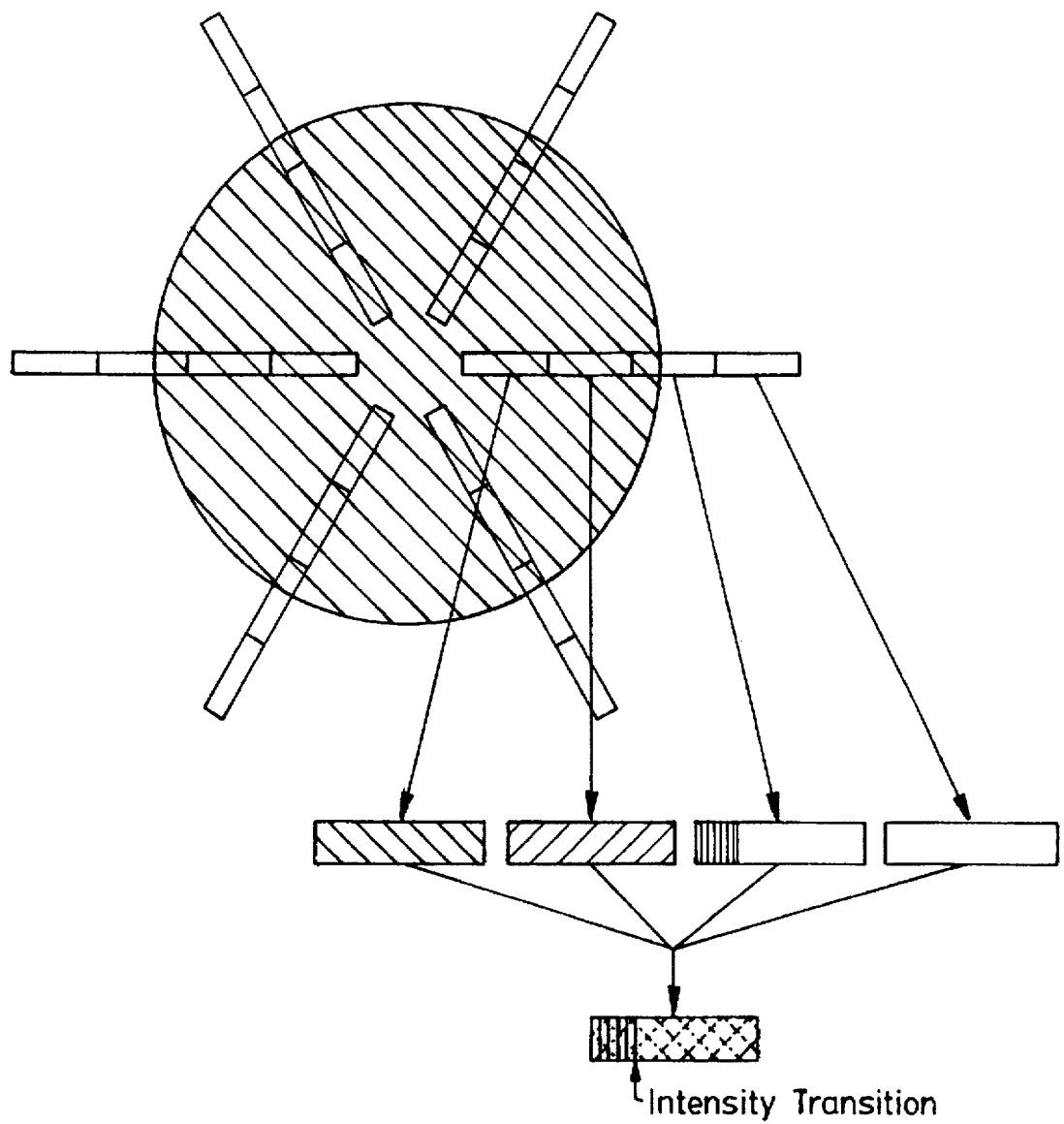
FIG. 6 depicts the overlay concept with the Earth horizon transition occurring within the overlay of the third field-of-view as an example of the net radiometric effect of several image overlays.

The size of the mirror segments 40, 42, 44 and 46 in the limb-looking mirror 32 determines the input aperture of the system. In order to provide reasonable signal-to-noise ratios and to keep the sensor package small, a small number of mirror segments are preferred (four segments are shown in the module of FIGS. 2 and 3b). However, it will be understood that if the size of sensor 20 is increased the number of mirror segments, their aperture size, or the number of modules 30 may be increased as required. With the images of all four fields-of-view directed to the common detector 36 in each channel, the overlaid images provide a distinct transition point representing the boundary between the warm Earth and cold space. This is illustrated in FIG. 6 which shows the Earth filling two fields-of-view in each channel and partially filling the third. Thus the superposition of these images in an overlay provides a transition in the intensity between radiometric levels corresponding to the radiation from three Earths compared to that from two Earths.

The location of the intensity transition in each channel allows the determination of the angular distance between each horizon point and the optical boresight of sensor 20 coincident with the axis of symmetry 24 in FIG. 2. Knowing these angles for at least two diametrically opposed points allows the calculation of the boresight direction relative to the centre of the Earth. If more than two channels are available, then the more general case can be solved plus orbital altitude can be estimated and/or improved accuracy can be obtained.

In the specific application of the satellite attitude sensor, detector 36 is preferably an infrared sensor for measuring thermal radiation from the earth which is converted to an electronic signal and includes readout electronics. The detectors preferably operate between 4 and 16 microns. The basic resolution of sensor 20 is dependent on the size of detector 36 and the fields-of-view. For the described implementation, a 256 element (pixel) linear array is assumed matched to a 10 degree field-of-view resulting in about 0.04 degree per pixel. Thus the determination of attitude within 0.05 degrees (3σ) is achievable. At the lowest altitude of 200 km, the resolution of 0.04 degree represents about 1 km on the horizon which is smaller than the variation expected in the height of the Earth's atmospheric layer when viewed in the wideband thermal infrared region of the spectrum.

Figure 7:
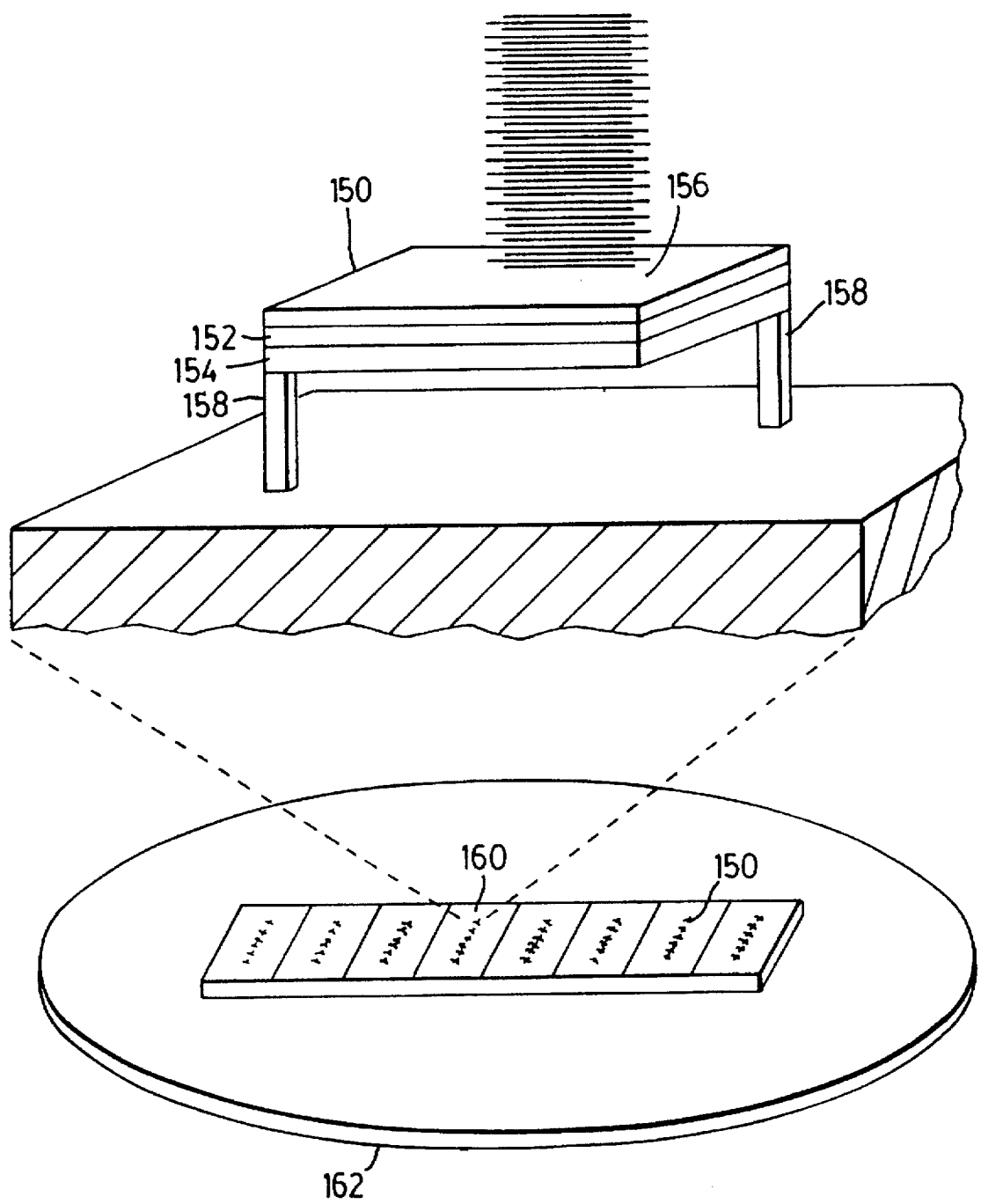
FIG. 7 illustrates a preferred microbolometer detector used for detecting thermal radiation in accordance with the present invention.

A preferred uncooled microbolometer for use in the present sensor for detection of thermal radiation is disclosed in a publication by Jerominek et al. "Micromachined, Uncooled, $VO_2$-based, IR Bolometer Arrays", National Optics Institute, presented at SPIE AeroSense, Orlando, Fla., USA, April 1996. FIG. 7 shows the configuration of the uncooled microbolometer comprising an array of free standing microbolometer elements 150 each comprising a $VO_2$ thermometer 152 sandwiched between inner and outer $Si_3N_4$ layers 154 and 156 respectively. Each element is supported on pedestals 158 having low thermal conductance above the detector support 160. The support 160 is mounted on a semiconductor wafer 162 on which the ancillary circuitry is etched.

The detector array may be utilized in a number of aspect ratios, i.e. the ratio of length to width or rows to columns. A linear array has only a few (minimum of only one) column of pixels. A quasi-linear array has a high aspect ratio but a significant number of columns, e.g. 20. Other two-dimensional arrays may have various numbers of rows and columns. The aspect ratio of choice is dependent on the particular sensing application.

The utilization of uncooled microbolometer detectors as disclosed in Jerominek et al. means that no additional cooling equipment is required. Most sensors that use thermal infrared array detectors need to have thermoelectric or cryogenic cooling capability in order to reduce the detector dark current and provide adequate sensitivity. With no moving parts and no thermoelectric or other cooling, the present sensor is able to use its electrical power for processing. The microbolometer detectors are inherently immune from normal radiation expected on orbit. The remainder of the electronics can be made radiation hardened to the appropriate degree.

It will be appreciated that the material of construction of mirrors 32 and 34 will depend on the particular wavelength region(s) in which the sensor is designed to operate. For the SAS application in the thermal infrared, unpolished aluminum mirrors can be readily used. Glass or plastic may be used in place of aluminum with evaporated coatings on the optical surfaces. A mixture of different detectors sensitive to different wavelength regions can be used in the different modules to provide multi-spectral imaging.

Figure 8:
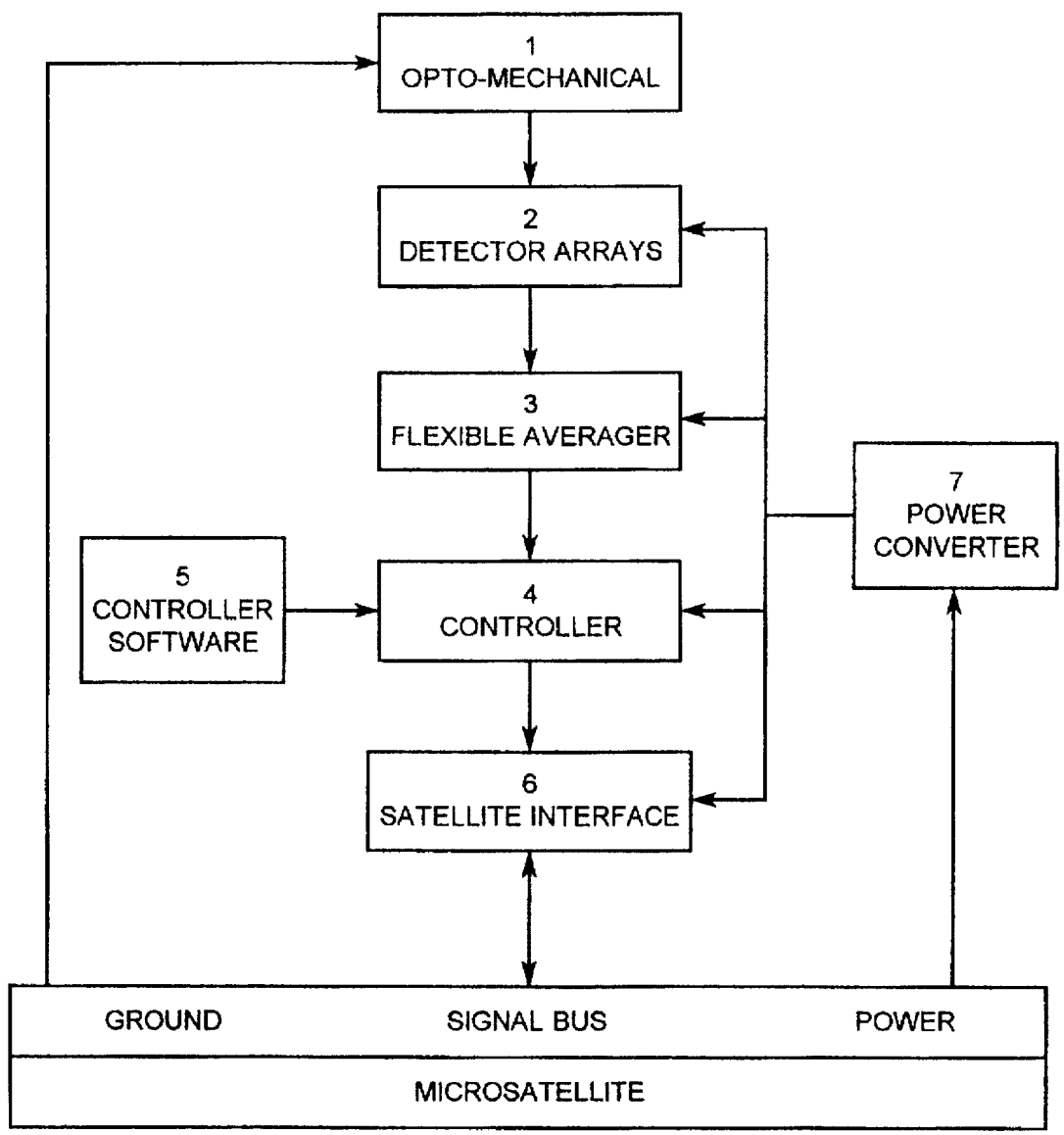
FIG. 8 is a block diagram of the satellite attitude sensor configured for operation on a satellite.

The attitude sensor includes an on-board microprocessor which is interfaced with the main satellite computer and other instrumentation. The mechanical and electrical interfaces am designed for generic applications rather than being specific to a particular satellite bus. The use of active pixel sensors and signal processing circuitry in conjunction with the detectors allows the use of low cost electronics and on-chip processing. FIG. 8 is a block diagram of the satellite attitude sensor. The arrows indicate the direction of flow of information and/or control amongst the various subassemblies. The opto-mechanical subsystem interfaces with the detector arrays which provide image data to the flexible averager processing electronics. The controller configures and operates the sensor, performs the final processing steps and interfaces with the satellite.

When used in the SAS application, the satellite attitude sensor disclosed herein is an optical instrument which is used to allow satellites orbiting the earth to determine their pointing error with respect to the earth. This error is used in conjunction with various actuators on board the satellite to maintain the attitude of the satellite in a specified relationship with the earth. The sensor is provided with sufficient processing capability to determine the satellite attitude error with respect to the sensor boresight. This will entail the detection of the earth-space transitions and the fitting of the horizon with appropriate routines. The orbit altitude may also be computed from the data, or, alternatively, the orbit altitude may be provided as an input to further improve the attitude measurement.

The method and device forming the present invention represents a significant improvement on current technology in that only one sensor is required to provide the same, or more information, normally provided by two or more sensors. For example, the sensor may be operated over a wide range of orbit altitudes, potentially from low earth orbit (LEO) to geosynchronous earth orbit (GEO). This represents an altitude variation from about 200 to 36,000 km. No single, current sensor can provide such a range of service. Present sensors are designed to operate at a specific altitude only.

Another feature of the present sensor which makes it superior to current designs is that it can operate in both non-spinning and spinning modes (referring to the method of stabilization of the satellite). Many satellites are spin stabilized and these require spinning earth sensors which allow the determination of the satellite spin axis with respect to the orbital plane and also the azimuth angle between the earth centre and some other reference point on the spinning satellite. In addition to earth sensors, most satellites require spinning sun sensors in order to determine the sun elevation and azimuth angle with respect to the orbit plane and the earth centre. The present satellite attitude sensor can provide all these functions in a single sensor since it can detect the sun as well as the earth. It may also be possible to locate the moon but this is not usually required.

The sensor is capable of providing attitude data in both spinning and staring modes of operation and at update rates of 100 Hz or higher. This may be achieved by detecting the sun elevation angle with respect to the satellite spin axis and determining its azimuth angle with respect to the centre of the earth. The sun is detectable as a spot several pixels in diameter. At a satellite spin rate of, say 5 rpm, which is 30 degrees/second, and an update rate of the detector of 100 Hz, the satellite rotates 0.3 degrees between updates. Thus, as the sun crosses the field-of-regard of any of the optical channels, at least one readout will contain an image of the sun which can be located within the field-of-regard by the unique properties of the sun, that is, the size and intensity of the distinct spot and its predictable motion and recent history.

Most geosynchronous satellites are launched into a transfer orbit which stretches from LEO to GEO. In this phase, the satellites are normally spin stabilized and carry appropriate sensor equipment to allow the determination of sun and earth position as indicated above. After the apogee motor is fired and the satellite orbit is circularized at geosynchronous altitude, the satellite will be despun and the earth will be acquired using non-spinning earth sensors. Thus, the present sensor can effectively replace both sets of equipment with one unit thus saving considerable cost in procurement and launch mass. Launching a mass to GEO is about 10 times more expensive than the cost of launching to LEO.

The sensor disclosed herein has no moving parts, which is another advantage over many current sensor designs which use scanning mirrors or spinning assemblies. The lack of moving parts provides a significant boost in reliability which is of prime concern to both satellite integrators and customers alike since the attitude control subsystem on a satellite is considered one of the most critical systems necessary to mission success. The sensor also has built-in redundancy which allows it to tolerate some failures and provide a graceful degradation in performance.

While the optomechanical design specifically described herein uses reflective optics which reduces sensor mass. However, it will be appreciated that refractive optics could be used as well which will be discussed below with reference to a satellite based wildfire detection system using the overlay principle.

It will be understood that various modifications of the method may be readily made. Examples of various other embodiments include mixing the fields-of-regard amongst the different channels to provide for two or more altitude ranges; using more than 4 fields-of-view within the field-of-regard to allow higher resolution or wider angular range; having more than six channels to provide greater redundancy and/or more fields-of-regard as required; monitoring thermal targets other than the Earth, for example, other planets and satellites, or any source of thermal radiation which can be differentiated against its background; using different detectors amongst the different channels which are sensitive in different spectral regions to provide specific discrimination of observed features or targets; use of refractive optics supplying multiple fields-of-view onto a single detector; use of cryogenically cooled or thermo-electrically cooled detectors; using an optical module comprising beamsplitters, including dichroics, to provide multi-image overlays.

For example, detectors may be used which operate in the ultraviolet, visible, near-infrared, short-wave infrared, middle-wave infrared, and long-wave infrared to produce overlay images. The use of any combination of detectors amongst the various channels to provide multi-purpose spectral observations for data fusion applications provides significant configurational flexibility of the system.

Therefore, it will be understood that more broadly, the present invention provides a method for distinguishing a boundary of an object or the object itself from its background. Specifically, the boundary of an object or the object itself can be differentiated from its background by focussing radiation (in the visible, infrared, microwave, ultraviolet or higher energies) from at least two fields of view substantially spanning the boundary of the object, or the object itself, and background region adjacent to the boundary or the object itself and superimposing the radiation from the two fields of view as images onto the appropriate detector(s) and then processing the intensity data to correlate spatial transitions in intensity of the superimposed images with a boundary of the object or the object itself. The particular wavelength(s) of the electromagnetic radiation being detected will depend on the application at hand. In the case of the satellite attitude sensor disclosed herein it is preferred to detect thermal radiation from the earth/space background since there is a sharp contrast between the thermal signatures of the earth (or other celestial bodies) and vacuum of space. Those skilled in the art will appreciate that the satellite attitude sensor may be used to detect the sun since it emits thermal radiation against the background of space.

The preferred number of channels (optical modules) and preferred number of fields-of-view in each channel will depend on the particular application at hand. The satellite attitude sensor based on overlaid thermal images from several fields of view uses at least three channels (optical modules) to obtain the three quantities of interest while other channels provides redundancy. An example of an application in which one channel may be used is for tracking a specific star within a known background of stars using the visible region of the spectrum. The specific star location is monitored and the star field background is used to provide additional information about the satellite attitude with respect to the sensor boresight, namely yaw attitude. More generally, the overlay principle may be applied to existing star tracking instruments used in spacecraft attitude sensors, in order to increase the field of view of the star tracker.

Figure 9:
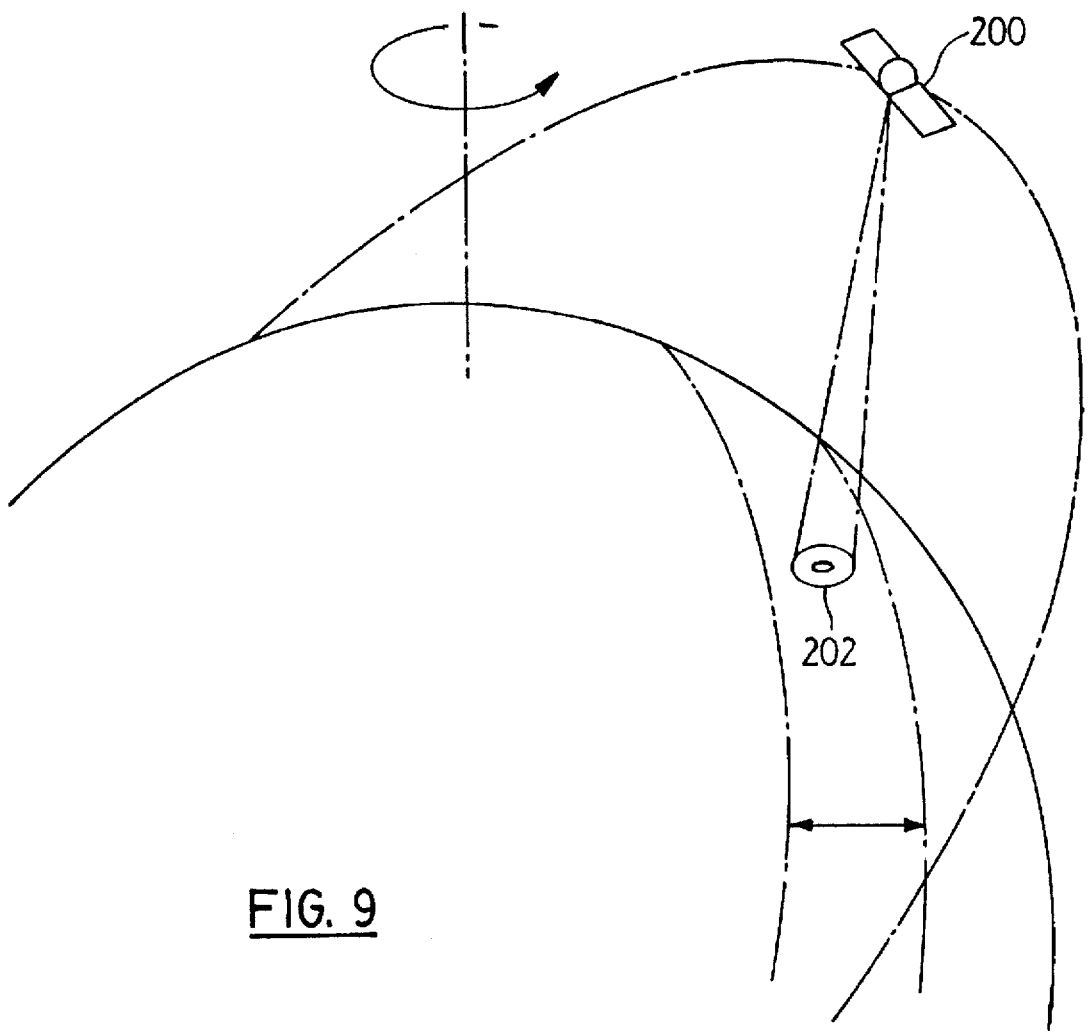
FIG. 9 illustrates the method of the present invention adapted for a satellite-based wildfire detection system.

A specific application of the overlay principle for a satellite based wildfire detection system will be described. FIG. 9 illustrates the method of the present invention for wildfire detection from space. A satellite 200 in near polar low-earth orbit employs an infrared camera with high spatial resolution and two spectral channels to detect a wildfire 202 on the planet. The ratio of the signals from the two spectral channels in a given 'ground footprint' of a detector pixel can be used to create an effective temperature map of the ground that suppresses clutter from artificial objects, sunlight glint and the thermal background.

The satellite-based system for wildfire detection preferably includes a camera system for location of fire 'events', an attitude sensor for geo-referencing of the events and an attitude control system to ensure that the camera is pointed approximately in the desired direction. The wildfire detection system preferably requires high spatial resolution on the ground for clutter suppression, but requires only moderate spatial location (on the order of a kilometer or so). Minimal spectral resolution is needed. The baseline concept is to use two spectral channels in the 2–4 micrometer spectral region.

Limitations to the swath, the area on the earth's surface covered by a single orbit, come from the number of pixels in the array detector and the quality of the camera optics. A larger swath increases the coverage per satellite orbit and reduces the number of satellites needed for complete coverage and a short revisit time. There are generally large cost advantages to increasing the swath per satellite. An increase in swath at the expense of spatial resolution is not desirable for the wildfire detection scenario because of scene clutter. Other alternatives for increasing the swath include the incorporation of multiple cameras on each spacecraft and increasing the field of view of each camera. The use of overlaid images for increasing the camera field of view without significant changes to the mass or power requirements of the satellite is a major advantage.

Figure 10:
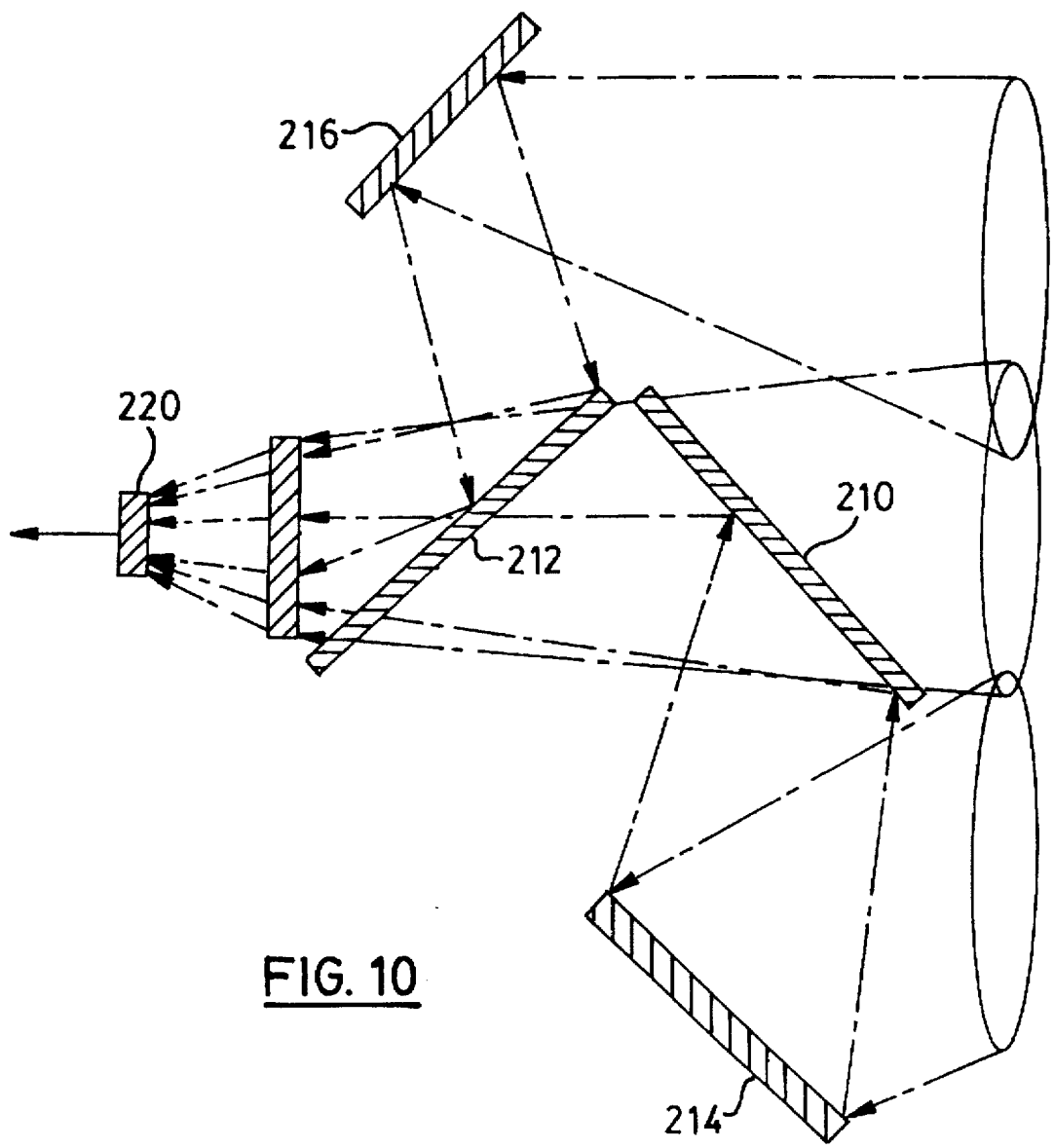
FIG. 10 is a diagrammatic representation of an optical channel which overlays images from three fields-of-view used in the system of FIG. 9.
Figure 11:
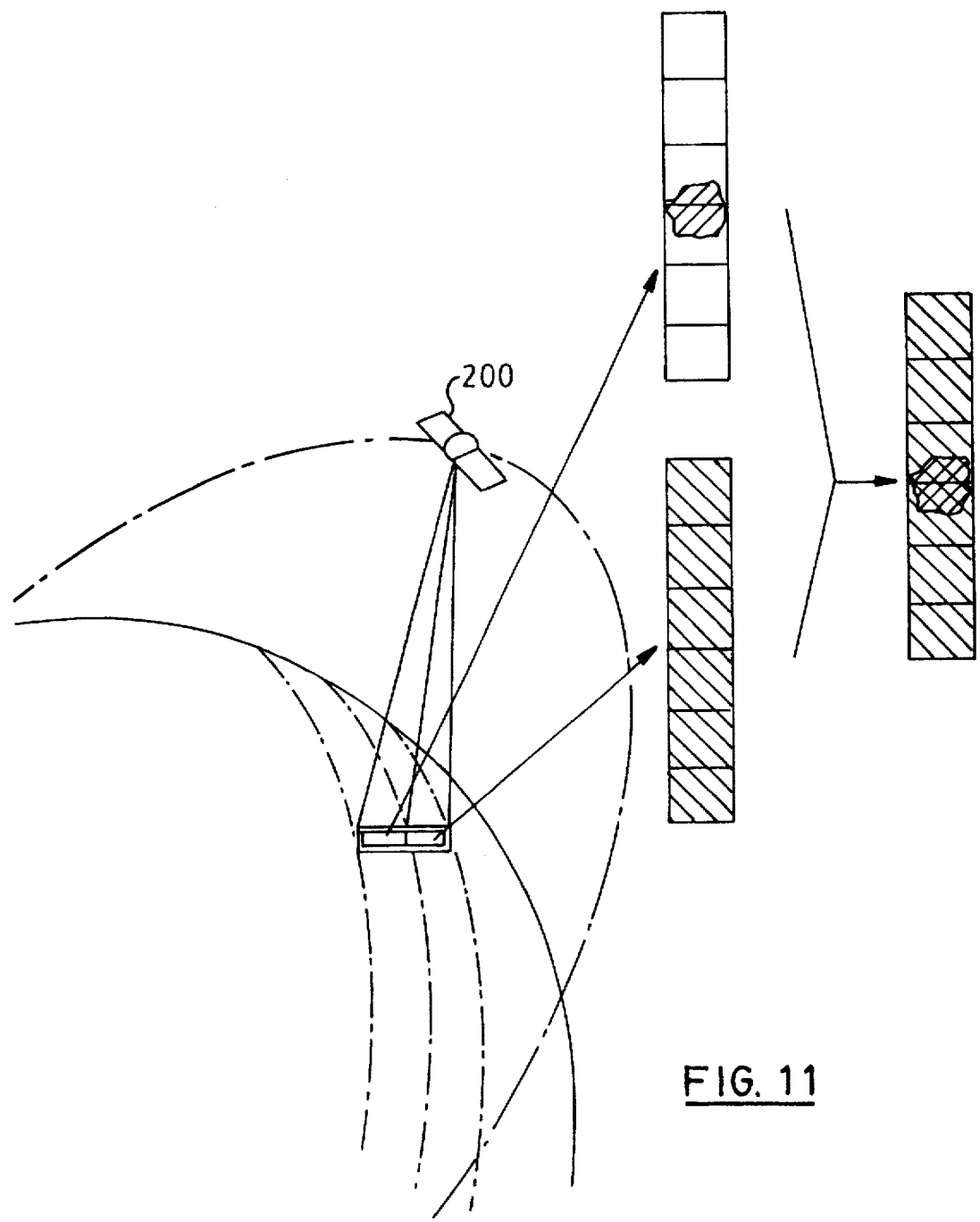
FIG. 11 illustrates overlay of two fields of view in the system of FIG. 9.

For a given camera design, a beamsplitter (or similar method of wavefront division) can be used to allow each pixel of the detector array to view multiple points in the field of view. As shown in FIG. 10, the optical module is designed using beamsplitters 210 and 212 and mirrors 214 and 216 to direct images from several (in this case three) fields of view to overlap on the infrared detector array 220. Each detector pixel receives light from three distinct regions. FIG. 11 illustrates the overlay of two images. Features from one region are added to 'background' signals from the second region. Because the spatial signature of an incipient wildfire is distinctive and localized, it can be readily distinguished from the background. There is a 'degeneracy' in the location of an 'event', in the sense that the event could be in any of the regions that are combined by the beamsplitters.

A significant advantage of the overlay approach is an increase in the effective field of view of the camera system without a change in the angular size of the scene viewed by each pixel. Drawbacks include a reduction in signal strength and the degeneracy in the location of the wildfire. The signal strength reduction is approximately proportional to the number of overlays, assuming that the beamsplitter transmittances are correctly chosen and that absorption and second-surface reflections are negligible. Because each detector pixel looks at only a small, number of regions, three in FIG. 10, the degeneracy in the location of an 'event' can often be resolved by the context of the image, by ancillary data or by the signature from spectral coding of the imagery. When events of known location are being monitored, the degeneracy of the image is generally not important unless a new event is masked by the known event. The low probability of a wildfire causes the expectation of such masking to be small. If the density of wildfires is $10^{-4}$/km, then the probability of a masked event can be as low as $10^{-8}$ for a 10 m ground footprint. Changing the wavelength for the various overlays can reduce losses and assist in the removal of the location degeneracy. In addition, a dichroic beamsplitter can act as the spectral selector for the camera system.

It will be understood by those skilled in the art that because the present invention utilizes the principle of overlaid images to differentiate objects, one of the main criteria for application of this technique is that the target should be distinct against the background. Therefore, the present method may be used as long as the background is relatively uniform or well known and the scene is changing slowly with respect to the detector sampling rate. Some other examples of possible applications in the various spectral regions are as follows: visible star tracker locked on a specific star against and known background of stars; surveillance and tracking of ships at sea; a thermal infrared sensor for detection and tracking of spacecraft and/or human workers in the vicinity of a space station.

While the method of the present invention has been described and illustrated with respect to the preferred and alternative embodiments, it will be appreciated by those skilled in the art that numerous variations of these embodiments may be made without departing from the scope of the invention disclosed herein.

Therefore what is claimed is:

1. A method for distinguishing a boundary of an object from its background, comprising:

detecting electromagnetic radiation from at least two fields of view substantially spanning at least a portion of the boundary of the object and background adjacent to said at least a portion of the boundary and superimposing the detected radiation from said at least two fields of view as images onto a common detection means; and correlating a spatial transition in intensity of said superimposed images on said common detection means with the boundary of the object.

2. The method according to claim 1 wherein the step of detecting electromagnetic radiation comprises detecting thermal radiation.

3. The method according to claim 2 wherein the step of superimposing said images comprises reflectively focusing said images from said at least two fields of view onto said common detection means.

4. The method according to claim 2 wherein the step of superimposing said thermal radiation comprises refractively focusing said images from said at least two fields of view onto said common detection means.

5. The method according to claim 3 wherein the step of reflectively focusing said images comprises reflecting the thermal radiation from segments of a segmented mirror onto said common detection means, wherein said segments of said segmented mirror have a preselected angle of orientation between them.

6. The method according to claim 5 wherein four fields of view are focussed onto said common detection means from a segmented mirror comprising four segments.

7. A device for distinguishing a boundary of an object from its background, comprising:

a sensor housing;

a common detection means mounted in said housing for detecting electromagnetic radiation;

optical focusing means mounted in said sensor housing for superimposing electromagnetic radiation from at least two fields of view substantially spanning at least a portion of the boundary of the object and background adjacent to said at least a portion of the boundary as overlaid images onto said common detection means; and processing means for correlating a spatial transition in intensity of said overlaid images on said common detection means with the boundary of the object.

8. The device according to claim 7 wherein said common detection means is a pixelated thermal radiation detector.

9. The device according to claim 8 wherein said optical focusing means is an optical module releasibly attachable to said sensor housing, said optical module comprising a module housing, said pixelated thermal radiation detector and processing means associated therewith being mounted in said module housing, a segmented mirror in said module housing provided with at least two mirror segments disposed at a preselected angle with respect to each other, and a focusing mirror in said module housing for focusing images from each mirror segment onto said pixelated thermal radiation detector.

10. The device according to claim 9 wherein said sensor housing defines an axis, and a plurality of said optical modules symmetrically disposed about said axis in said sensor housing.

11. A device for determining satellite orientation and attitude with respect to a celestial body, comprising:
a) a sensor housing;
b) at least one optical focusing means located in said sensor housing, said optical focusing means comprising a common detection means, a segmented mirror having at least two mirror segments disposed at a preselected angle with respect to one another, and focusing mirror means located with respect to said segmented mirror for receiving images reflected from each mirror segment and focussing said images in overlaying relationship onto said common detection means; and
c) processing means connected to said detection means for correlating spatial transitions in intensity of said overlaid images on said common detection means with a boundary of the celestial body and calculating therefrom satellite attitude with respect to the celestial body.

12. The device according to claim 11 wherein said at least one optical focusing means is an optical module releasibly attachable to said sensor housing, said optical module comprising a module housing, said detection means and signal processing means associated therewith being mounted in said module housing, a segmented mirror in said module housing provided with at least two mirror segments disposed at a preselected angle with respect to each other, and a focusing mirror in said module housing for focusing images from each mirror segment onto said detection means.

13. The device according to claim 12 wherein said detection means is a pixelated thermal radiation detector.

14. The device according to claim 13 wherein said sensor housing defines an axis, and a plurality of said optical modules symmetrically disposed about said axis in said sensor housing.

15. The device according to claim 14 wherein said at least two mirror segments is n mirror segments, wherein n is a whole number greater than or equal to 2.

16. The device according to claim 15 wherein said preselected angle between each mirror segment is in the range from about 1 degree to about 15 degrees.

17. The device according to claim 15 wherein n equals 4 mirror segments.

18. The device according to claim 17 wherein said preselected angle between each mirror segment is about 2.5 degrees.

19. The device according to claim 18 wherein said plurality of optical modules is six optical modules.

20. The device according to claim 13 wherein said pixelated thermal radiation detector comprises a plurality of microbolometer detector elements forming an array on a detector support member.

21. The device according to claim 20 wherein said detector support member is mounted on a semiconductor chip comprising signal processing circuitry connected to said pixelated thermal infrared detector.

22. A satellite sensor device for detecting fires on the earth, comprising:
a sensor housing;
an infrared detector mounted in said housing for detecting infrared electromagnetic radiation characteristic of fires;
optical focusing means mounted in said sensor housing for superimposing images from at least two adjacent fields of view of the earth's surface as overlaid images onto said infrared detector; and
means for correlating a spatial transition in intensity of said overlaid images on said infrared detector with a boundary of a region emitting infrared radiation characteristic of fires.

23. The device according to claim 22 wherein said infrared detector is a short-wave infrared detector sensitive to the spectral range of from about 1.4 microns to about 4 microns.

24. The device according to claim 23 wherein said short wave infrared detector is a pixelated short wave infrared detector.

25. The method according to claim 1 wherein the step of superimposing said images onto said common detection means includes superimposing the images onto a pixelated detector.

26. A device for determining satellite orientation and attitude with respect to a celestial body, comprising:
a sensor housing;
pixelated detection means mounted in said sensor housing for detecting electromagnetic radiation;
optical focusing means mounted in said sensor housing for collecting and focusing electromagnetic radiation from at least two fields as overlaid images onto said pixelated detection means; and
processing means connected to said pixelated detection means for correlating a spatial transition in intensity of said electromagnetic radiation from said field of view with a boundary of said celestial object.

27. The device according to claim 26 wherein said pixelated detection means is a pixelated infrared detector.

28. The device according to claim 27 wherein said optical focusing means is an optical module releasibly attachable to said sensor housing, said optical module comprising a module housing, said pixelated infrared detector and processing means associated therewith being mounted in said module housing, a segmented mirror in said module housing provided with at least two mirror segments disposed at a preselected angle with respect to each other, and a focusing mirror in said module housing for focusing images from each mirror segment onto said pixelated infrared detector.

29. The device according to claim 28 wherein said sensor housing defines an axis, and a plurality of said optical modules being symmetrically disposed about said axis in said sensor housing.

30. A satellite having a satellite housing, comprising:
an orientation and attitude sensor for determining satellite orientation and attitude of said satellite with respect to a celestial body, said sensor including;

a sensor housing attached to said satellite housing;

common detection means mounted in said sensor housing for detecting electromagnetic radiation;

optical focusing means mounted in said sensor housing for collecting and focusing electromagnetic radiation from at least two fields of view as overlaid images onto said common detection means; and processing means connected to said common detection means for detecting a spatial transition in intensity of said overlaid images.

31. The satellite according to claim 30 wherein said common detection means is a pixelated infrared detector.

32. The satellite according to claim 31 wherein said optical focusing means is an optical module attached to said sensor housing, said optical module comprising a module housing, said pixelated infrared detector and signal processing means associated therewith being mounted in said module housing, a segmented mirror in said module housing provided with at least two mirror segments disposed at a preselected angle with respect to each other, and a focusing mirror in said module housing for focusing images from each mirror segment onto said pixelated infrared detector.

33. The satellite according to claim 32 wherein said sensor housing defines an axis, and a plurality of said optical modules being symmetrically disposed about said axis in said sensor housing.

* * * * *